United States Patent [19]

Shoberg

[11] Patent Number: 4,580,645
[45] Date of Patent: Apr. 8, 1986

[54] CONSTANT MOMENT WEIGH SCALE WITH MISALIGNMENT COMPENSATOR

[75] Inventor: Ralph S. Shoberg, Brighton, Mich.
[73] Assignee: GSE, Inc., Farmington Hills, Mich.
[21] Appl. No.: 656,096
[22] Filed: Sep. 28, 1984
[51] Int. Cl.⁴ .................. G01G 3/00; G01G 3/14; G01G 21/10; G01G 21/12
[52] U.S. Cl. .................. 177/211; 177/225; 177/255; 177/187
[58] Field of Search ......... 177/225, 255, 211, DIG. 9, 177/187, 188

[56] References Cited

U.S. PATENT DOCUMENTS

| | | | |
|---|---|---|---|
| 3,805,604 | 4/1974 | Ormond | 177/211 |
| 3,938,603 | 2/1976 | Shoberg et al. | 177/DIG. 9 |
| 4,050,532 | 9/1977 | Provi et al. | 177/211 |
| 4,461,364 | 7/1984 | Strickler | 177/255 |
| 4,471,847 | 9/1984 | Ljungström | 177/211 |

Primary Examiner—E. A. Goldberg
Assistant Examiner—Patrick W. Foster
Attorney, Agent, or Firm—Krass & Young

[57] ABSTRACT

A weigh scale apparatus in which forces caused by the applied load are transformed into moments of opposite sense and applied to opposite ends of a substantially rigid beam. Bending deflection of the beam is measured by centrally disposed strain gauge resistors to produce an electrical signal quantity proportional to the applied load. The conversion of applied load to moments of opposite sense is accomplished by a pair of spaced parallel pivot members which are suspended between the load receiving pan and the base such that the pivots tend to rotate in opposite directions. The beam is mechanically connected between the pivots such that it is subjected to the bending moment over substantially its entire length. A flexure hinge is provided adjacent each end of the beam to render the beam soft or compliant with respect to twisting forces imposed on the beam with the result that the twisting moment introduced into the beam in response to a given magnitude of twist is greatly reduced to a point where it generates no significant cross-talk in the beam such as would affect the accuracy of the bending stress being measured by the beam in response to the opposite rotation of the pivots.

9 Claims, 7 Drawing Figures

CONSTANT MOMENT WEIGH SCALE WITH MISALIGNMENT COMPENSATOR

BACKGROUND OF THE INVENTION

This invention relates to a weigh scale apparatus and more particularly to a scale which employs a beam type flexure element and means to detect bending of the beam as a measure of the applied load.

Weigh scale apparatus, other than the laboratory balanced type, typically comprise a spring element such as a coil or wrap spring or a torsion bar which is deflected in proportion to applied loads. The traditional means for sensing spring deflection are such that it is difficult and expensive to attain a high degree of accuracy. Thus, an inexpensive device is typically not precise is its measurements. Moreover, the prior art scales are also typically quite sensitive to the point on the pan or load receiving surface at which the load is applied; i.e., a non-centered load on the pan tends to produce an inaccurate reading.

In U.S. Pat. No. 3,938,603, assigned to the assignee of the present application, a constant moment weigh scale is disclosed which overcomes noted disadvantages of the prior art by providing a scale which can be manufactured so as to produce an extremely high degree of accuracy with relatively little expense and which is relatively insensitive to non-centered load application. The scale of U.S. Pat. No. 3,938,603 includes a base; a load receiving member such as a pan; a pair of pivot members spaced apart and disposed mechanically between the pan and the base so as to experience a turning moment when a load is applied to the pan; and a beam connected to a hence "floating" between the two pivot members. The turning moments of the pivot members generated in response to application of a load to a pan are applied to opposite ends of the beam to cause a bending deflection of the beam and means are provided at the center of the beam for measuring the tension and compression forces in the beam due to the bending. The apparatus is constructed such that the bending movement at the center of the beam is a constant value regardless of the position of a given weight on the load receiving member. This scale, while generally satisfactory in most typical applications, sometimes can pick up "cross-talk" or spurious input signals in the beam resulting from excess or cumulative manufacturing tolerances in the various parts or resulting from disposition of the base of the scale on an imperfect support surface.

The present invention retains all of the noted advantages of the scale of U.S. Pat. No. 3,938,603 while providing a simple and effective means for compensating for spurious input signals resulting from excess tolerance variations, misalignment, or deflections of the base structure.

BRIEF SUMMARY OF THE INVENTION

In the invention scale, means are provided to essentially decouple the beam from twisting or other extraneous forces resulting from misalignments within the scale or resulting from placement of the scale on an imperfect surface.

According to one feature of the invention, the bending measuring section is provided at the center of the beam and torsionally compliant flexure hinges are provided at each end of the beam adjacent the connections of the beam to the pivot members. The flexure hinges have the effect of softening the beam with respect to twisting forces introduced by misalignment or imperfect support surfaces so that no significant stresses are introduced into the beam by virtue of these forces and no significant cross-talk is generated to influence the accuracy of the primary bending measurement.

In the disclosed embodiment of the invention, each flexure hinge comprises a section of the beam which is selectively cut away to retain the full height of the beam, and thereby retain the beam's resistance to bending stress, while minimizing the thickness of the beam so that the beam twists readily in response to extraneous misalignment inputs so as to avoid transmittal of spurious inputs to the bending measuring system of the beam.

DETAILED DESCRIPTION OF THE PREFERRED EMBODIMENT

Figure 1:
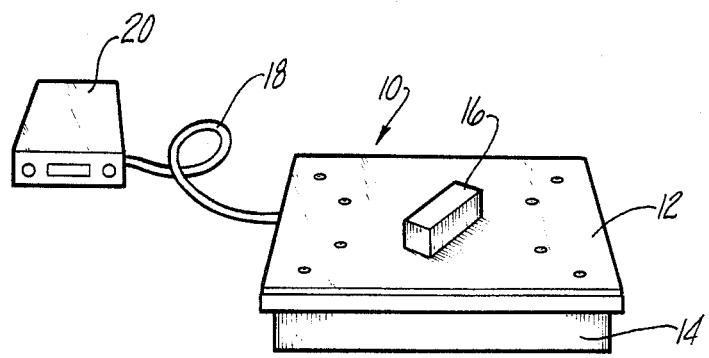
FIG. 1 is a perspective view of a weigh scale apparatus embodying the invention.

FIG. 1 illustrates a weigh scale designed for general purpose usage and including a flat pan 12 and an aluminum base 14. Weigh scale apparatus 10 responds to objects 16 positioned on pan 12 to produce an electrical signal which is conducted through a cable 18 to a digital type display unit 20. The unit 20 is responsive to an electrical signal voltage of varying amplitude to provide a temporary visual display of a number which represents the weight of the object 16 in a selected measurement system.

Pan 12 is essentially a rectangular body of substantially rigid material such as aluminum or steel having a depending peripheral lip or flange 13 and having discreetly located holes which receive fasteners to permit the pan to be secured to parallel rails 22a and 22b disposed within the confines of base 14. Base 14 comprises a thin floor bounded by outer longitudinal rails 14a and 14b and side rails 14c all secured together by machine screws, welds and combinations thereof.

Figure 2:
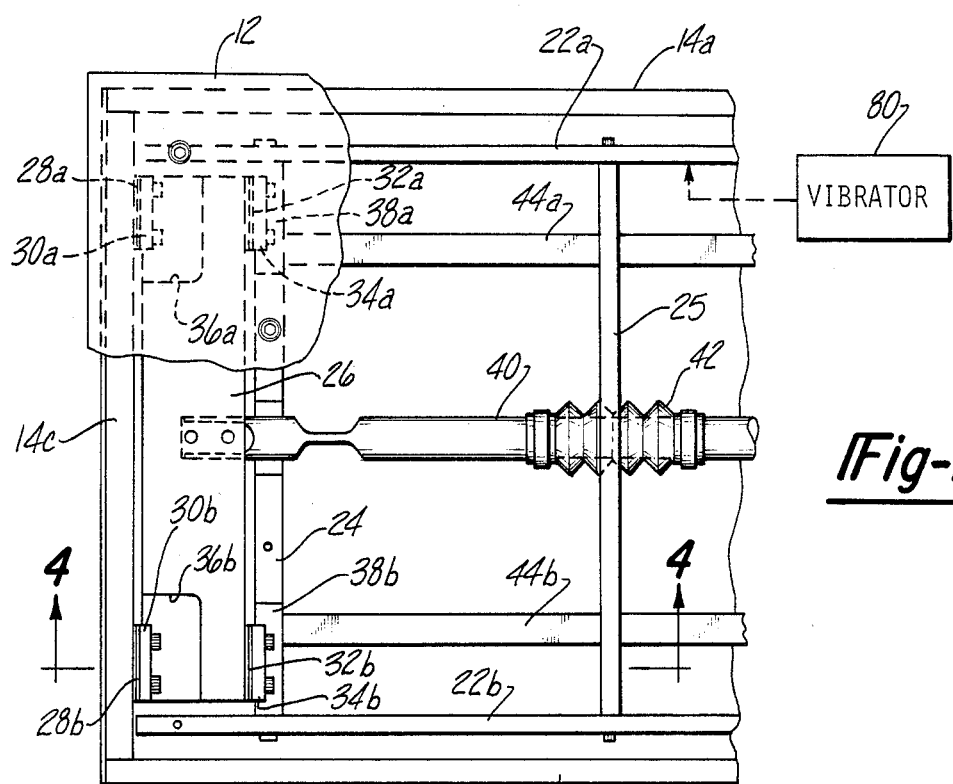
FIG. 2 is a plan view of a representative portion of the weigh scale apparatus of FIG. 1 with the cover or pan removed so as to show the interior details thereof.
Figure 3:
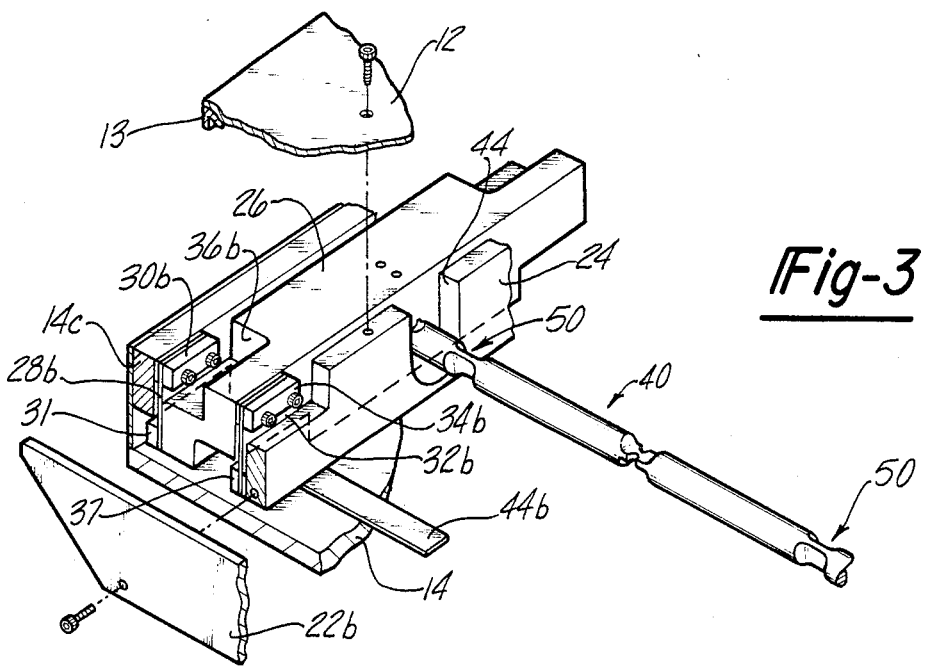
FIG. 3 is a perspective view of representative interior details in the weigh scale apparatus of FIG. 1.
Figure 5:
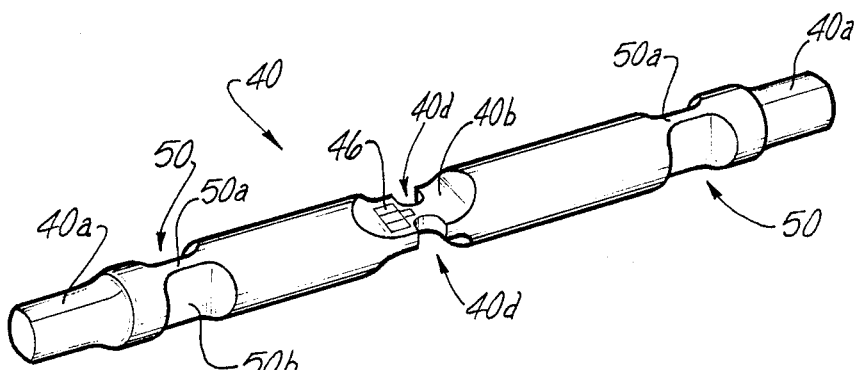
FIG. 5 is an enlarged perspective view of the beam employed in the invention weigh scale apparatus.

Longitudinal rails 22a and 22b provide flat horizontal surfaces which receive the interior surface of the pan 12 and hold the pan out of physical contact with any portion of base 14. Longitudinal rails 22a and 22b are interconnected by tranversely extending members 24, only the lefthand member of which is shown in FIGS. 2 and 3, it being understood that another such rail is similarly arranged about the center line of the assembly defined by a transverely extending stiffener strap 25. The upper surface of member 24 is in the same plane as the upper surfaces of rails 22a and 22b and hence helps support the flat interior surface of pan 12.

Figure 4:
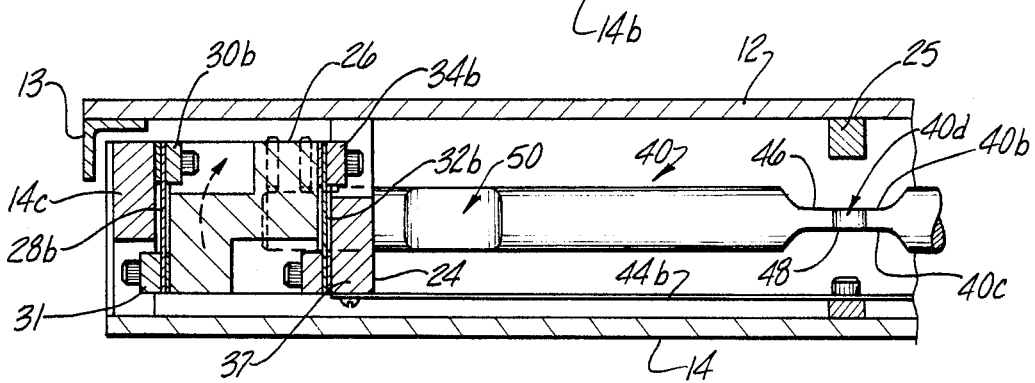
FIG. 4 is a side view, partly in section, of the interior details of the weigh scale apparatus of FIG. 1.

Mechanically suspended in the pan 12 and the base 14 and out of direct physical contact therewith is a pair of reversely similar pivot members 26 made of heavy machine material such as aluminum. One such pivot member is provided at each longitudinal end of the assembly shown in FIGS. 2–4. The suspension of pivot 26 is accomplished by steel strap assemblies 28 and 32 such that loads applied to the pan 12, such as by placing an object 16 on the pan, produce turning moments of opposite sense in the two longitudinally spaced and parallel pivot members 26 of the weigh scale, such turning tending to rotate the pivot members about their own longitudinal axis, such axis being parallel and in a plane just parallel to the plane of the pan 10 and perpendicular to the longitudinal axis of the overall device. Straps 28a and 28b are connected at the top to the base rail 14c and depend vertically therefrom so as to be secured at the bottom to the outside surface of the pivot member 26 shown in FIGS. 2, 3 and 4. Strap clamps 30a and 30b are provided for clamping the strap to the base rail 14c as best seen in FIGS. 2 and 3. Strap clamps 31 are provided at the lower end of the straps 28 to secure the straps to the pivot member 26 as best shown in FIGS. 3 and 4. Recesses 36a and 36b are provided to accomodate the clamps 30a and 30b respectively. In addition, straps 32a and 32b are secured at the tops thereof to the inside lateral surface of the pivot 26 and depend vertically therefrom to be secured at the bottom to the outside surface of the transversely extending load receiving rail 24. Upper strap clamps 34a and 34b are provided for securing the strap to the pivot 26 while lower clamp strap 37 is evident in FIGS. 3 and 4 to secure the straps at the lower end thereof. There are four straps at each end of the apparatus 10 for a total of eight straps, each of which is made of spring steel.

The disposition of the straps is such as to stably support the pivot 26 between the pan and the base such that when a load is applied to the pan 12 it is transmitted directly to the transversely extending member 24 which, as previous described, is spaced from the base 14. Therefore, the load tends to pull down on the straps 32a and 32b. Since the vertical reaction force in straps 28a and 28b appears at the longitudinally opposite surfaces and in the opposite sense, the applied load tends to rotate pivot 26 in the clockwise direction as seen in FIG. 4. Since a reversely similar apparatus is provided at the right end of the assembly 10, a reversely similar pivot experiences a turning moment of opposite sense in response to the applied load.

To resist as well as to measure the turning moments, a solid aluminum beam 40 of round stock is mechanically connected to and between the pivots 26. This is accomplished by machining suitable apertures through the sides of the pivots 26, forming flats 40a on the opposite ends of the beam, inserting the flat ends of the beams into the apertures, and providing set screws for securing the beam in place. Strain sensing means, hereinafter described in greater detail, are disposed on the beam 40 for the purpose of sensing the bending stress and generating electrical signals related thereto, such electrical signal quantity being indicative of the magnitude of the applied load and hence being appicable to the display device 20. A pleated flexible boot 42 is preferably clamped on to the beam 30 so as to protect the sensitive component of the strain sensing apparatus.

Anti-sway strap 44a and 44b are preferably provided, such straps being secured at the centers thereof to the base 14 and at the outer ends thereof to the members 24 to prevent any longitudinal swaying of the assembly comprising the pivot which actually floats between the pan and base to provide the transformation of the applied load into the turning moments as previously described.

Cut-outs 38a and 38b in the laterally extending member 24 provide clearance for the clamp locks 34a and 34b respectively and a recess is provided at each end of the pivot 26 to accomodate the clamp locks 37. Member 24 is machined to provide a relief 44 in the center thereof to accomodate beam 40. Cushion type spaces may be afforded between the clamp locks and the strap as desired.

To increase the sensitivity of the weigh scale device, the center of beam 40 is flattened at its top and bottom to provide parallel flat surfaces 40b and 40c and the beam in cut away at its sides to provide opposed slots 40d. Strain gauge resistors 46 are bonded to upper flat 40b and strain guage resistors 48 are bonded to lower flat 40c. Resistors 46 on flat 40b respond to compression in the beam 40 and resistors 48 on flat 40c respond to tension. Thus, bending stress caused by the turning moments is sensed.

Beam 40 is selectively cut away adjacent each end of the beam to provide flexure hinges 50. Specifically, the sides of the beam are cut away at each hinge 50 to provide a relatively narrow lateral section seen at 50a while retaining a full height vertical section 50b corresponding to the full diameter of the beam.

In operation, a load 16 placed on pan 12 generates opposed moments in opposite pivot members 26 and these opposed moments are applied to the opposite ends of beam 40 to attempt to bend or bow the beam downwardly in a vertical plane. This bending or bowing generates compression signals in upper resistors 46 and tension signals in lower resistors 48 and these signals are suitably processed and submitted to display unit 20 to provide a visual indication of the magnitude of load 16. Further details of the manner in which the scale operates to generate a visual indication of the magnitude of the load placed on the pan are disclosed in the above referenced U.S. Pat. No. 3,938,603.

Figure 6:
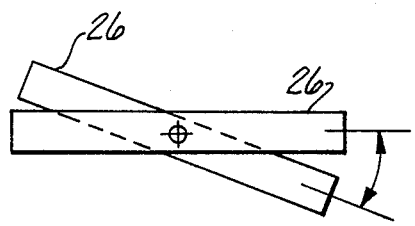
FIGS. 6 and 7 are exaggerated representations of misalignment situations occurring in typical scale usage situations.
Figure 7:
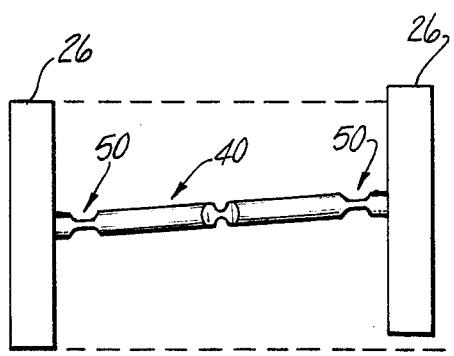

Since flexure hinges 50 retain the full height of the beam in vertical section, hinges 50 do not affect the ability of the beam to accurately respond to the bending moments imposed at its opposite ends. Hinges 50 do function, however, to effectively isolate the strain guages from spurious signals or cross-talk resulting from placement of the scale on an uneven support surface or excess manufacturing tolerances in the various parts of the scale. Specifically, if the scale is placed on an uneven support surface, the opposite pivot members 26 will tend to move out of their normal parallel disposition, as illustrated in an exaggerated sense in FIG. 6, with the result that a twisting force will be imposed on beam 40. Although beam 40 is primarily sensitive to bending in the vertical plane and, in theory, is insensitive to forces applied to the beam on axes other than the measuring axis, as a practical matter the strain sensitive elements have a cross-axis sensitivity to the forces applied on any axis with the result that such extraneous forces, if not dealt with, may generate cross-talk or spurious signals in the beam that can adversely effect the accuracy of the scale. Hinges 50, however, render the beam soft or compliant with respect to twisting forces imposed on opposite ends of the beam, with the result of that the twisting moment introduced into the beam in response to a given magnitude of twist is greatly reduced to a point where it generates no significant cross-talk in the beam such as would affect the accuracy of the scale. Similarly, if the pivots 26, because of excess or cumulative manufacturing tolerances in the various parts, become laterally displaced relative to each other, as illustrated in an exaggerated sense in FIG. 7, the hinges 50 will function to readily flex in response to this misalignment without introducing any significant extraneous stresses into the beam such as would adversely affect the accuracy of the scale. The disclosed flexure hinges thus function to effectively isolate the measuring section of the beam from extraneous stress signals while maintaining the required stiffness of the beam in the vertical measuring plane.

Whereas a preferred embodiment of the invention has been illustrated and described in detail, it will be apparent that various changes may be made in the preferred embodiment without departing from the scope or spirit of the invention.

I claim:

1. A weigh scale of the type including a loading pan, a measuring beam having a measuring section intermediate its ends, means operative in response to imposition of a load on said pan to bend said beam in a given plane, and means operative to sense and measure the stress created in said beam at said measuring section by such bending, the improvement wherein:
   (A) said scale further includes torsional decoupling means operative in response to a twisting displacement of an end of said beam resulting from a misalignment within said scale to render said beam soft in the torsional mode while retaining bending stiffness in said given plane whereby to minimize the stress created in said measuring section by said displacement and thereby minimize the crosstalk at said measuring section.

2. A weigh scale according to claim 1 wherein:
   B. said beam has a generally uniform cross-section throughout its length;
   C. said measuring section is located adjacent the longitudinal center of the beam; and
   D. said torsional decoupling means comprises sections of reduced thickness formed adjacent each end of said beam.

3. A weigh scale according to claim 2 wherein:
   E. said pan presents a generally horizontal load surface;
   F. said bending occurs in a generally vertical plane; and
   G. said sections of reduced thickness comprise sections of substantially full vertical height and relatively thin width.

4. A weigh scale according to claim 3 wherein:
   H. said beam has a generally circular cross-section; and
   I. said sections of reduced thickness are formed by removing portions of the beam at either side of a vertical longitudinal plane passing through the beam to leave a thin central section retaining substantially the full diametric height of the beam.

5. A floating beam weigh scale apparatus comprising:
   A. a base;
   B. a load receiving member spaced above said base;
   C. first and second spaced pivot members disposed between said base and said load receiving member;
   D. load transmitting means interconnecting said pivot members, said base, and said load receiving member and operable in response to imposition of a load on said load receiving member to produce respective moments in said pivot means of opposite sense and about spaced axes; and
   E. a substantial rigid beam connected to and extending between said pivot members and dimensioned and configured so as to offer relatively large resistence to bending, whereby a significant measurable bending stress of constant value is created in the center of the beam in response to the opposite moments produced in said pivot members upon imposition of a load on said load receiving member, and so as to offer relatively small resistance to twisting, whereby twisting forces introduced into the beam by virtue of misalignment of said pivot members generates no significant stress in said beam to obfuscate the measurable bending stress.

6. A floating beam weigh scale apparatus according to claim 5 wherein:
   F. said beam includes a measuring section located adjacent the longitudinal center of the beam; and
   G. said beam further includes torsional decoupling sections adjacent each end of the beam.

7. A floating beam weigh scale apparatus according to claim 6 wherein:
   H. said beam has a generally uniform cross-section throughout its length; and
   I. each torsional decoupling section comprises a section of reduced thickness formed adjacent the respective end of the beam.

8. A floating beam weigh scale apparatus according to claim 7 wherein:
   J. said load receiving member presents a generally horizontal load surface;
   K. said bending occurs on a generally vertical plane; and
   L. said sections of reduced thickness comprise sections of substantially full vertical height and relatively thin width.

9. A floating beam weigh scale apparatus according to claim 8 wherein:
   M. said beam has a generally circular cross-section; and
   N. said sections of reduced thickness are formed by removing portions of the beam at either side of a vertical longitudinal plane passing through the beam to leave a thin central section retaining substantially the full diametric height of the beam.

* * * * *